Feb. 5, 1935.    H. E. TOELLE    1,989,722
VALVE
Filed Aug. 7, 1931
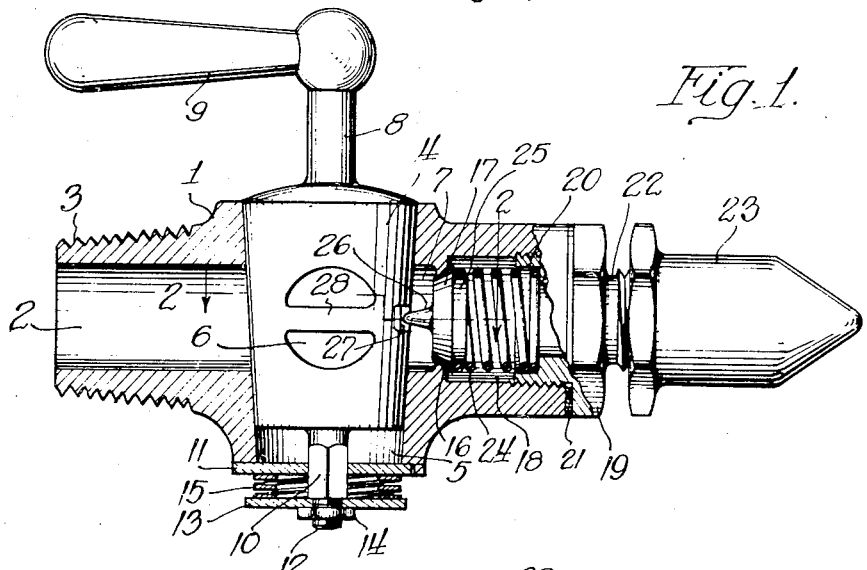
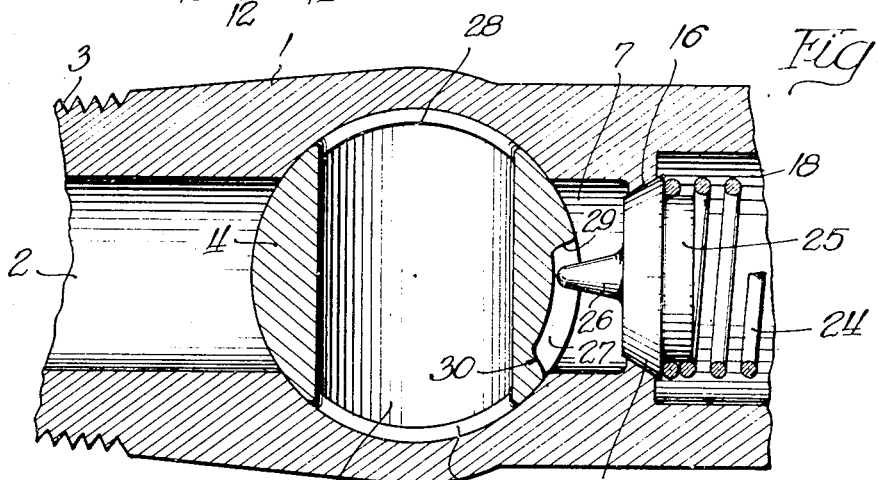
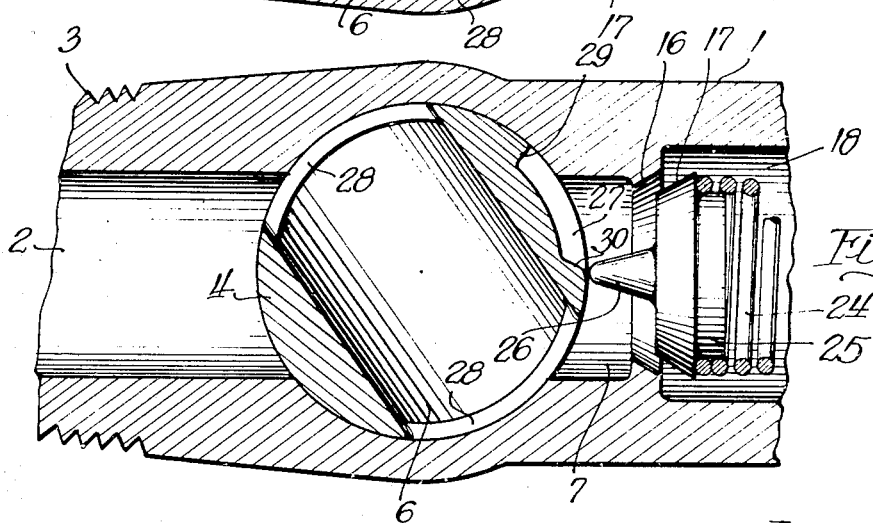
Inventor:
Herbert E. Toelle.
By Brown, Jackson, Boettcher & Dienner
Attys.

Patented Feb. 5, 1935

1,989,722

UNITED STATES PATENT OFFICE 1,989,722

VALVE

Herbert E. Toelle, Milwaukee, Wis., assignor to Milwaukee Gas Specialty Company, Milwaukee, Wis., a corporation of Wisconsin Application August 7, 1931, Serial No. 555,696

11 Claims. (Cl. 277—24)

This invention relates to valves, and is particularly concerned with the type of valve used for controlling the flow of gaseous fuel from a gas supply pipe to the gas burner of the ordinary domestic gas range.

The invention, in its broader aspects, is directed to providing a valve adapted for use on a gas range which is of simple and rugged construction, and which is so constructed as to eliminate the possibility of the valve being so finely set as to permit of the burner flame being accidentally extinguished.

The ordinary type of valve now in use, for the purpose of controlling the flow of gas to a gas burner comprises merely a rotating plunger with a gas passage therethrough which is rotated into and out of alignment with the inlet and outlet openings of the valve body. It is possible to so adjust this type of valve that the burner can be used as a simmering burner. This adjustment, however, is likely to be so fine that any draft or outside influence will extinguish the burner, and the resultant escape of unburned gas is highly undesirable, both from a toxic standpoint, and as a fire and explosion hazard.

The present invention is directed to a valve which is without these undesirable characteristics, and which is so designed and constructed that the possibility of occurrence of the conditions referred to previously is eliminated. Also, the valve of the present invention is adapted for use without any associated safety devices or cut-off devices designed for the purpose of preventing flow of gas after accidental extinguishing of the flame.

Specifically, the present invention is directed to a combination valve of the plug and poppet type, the plug valve being adapted, by means of a cam surface, to so operate the poppet valve as to secure abrupt opening and closing of the conduit to the valve body. After the poppet valve has once been opened, adjustment of the flow of gas is secured in the usual manner by rotation of the valve stem. The cam surface is so constructed that, upon closing of the valve, in order for the valve to act as a simmering burner, after a safe minimum closing value has been reached, any further closing of the valve results in abrupt closing of the conduit, and no further flow of gas to the burner is possible. In the same manner, in opening the valve, there is a certain interval of rotation of the control stem before the conduit opens, but once the opening point has been reached, the valve is immediately and abruptly opened to a suitable minimum value and further opening of the plug valve results in the usual adjustment of the flow of gas.

In order to acquaint those skilled in the art with the details of construction and operation of my valve, I will now describe it in detail, in connection with the accompanying drawing, in which:

Figure 1 is an axial vertical section, partially in elevation, of a valve embodying the present invention;

Figure 2 is a sectional view taken substantially on the line 2—2 of Figure 1, looking in the direction of the arrows; and Figure 3 is a sectional view similar to Figure 2, but showing the valve in a partially opened position.

Referring to the drawing, in which like reference numerals designate similar parts throughout the several views, a valve body for housing the operative parts of my valve is indicated generally by the reference numeral 1. This valve body has a nipple through which the inlet opening 2 passes and which nipple is threaded as at 3, and is adapted to be secured to the usual type of gas manifold or gas supply pipe, which is not shown in the drawing.

The valve body 1 has the tapering circular valve member 4 adapted to seat within the opening 5 in the valve body. The valve member 4 is of the usual plug type of valve, having the passage 6 therein which is adapted to be aligned with the inlet opening 2 for passing gas from the inlet opening to the outlet opening 7.

Valve 4 has an upwardly projecting stem 8, and a handle 9 is adapted to be secured thereon in any well known manner. A stem portion 10 projects from the lower part of the valve member 4 and passes through a flange plate 11 secured to the valve body 1 in any suitable manner. The stem portion 10 of the valve body 4 is threaded at its outer end as shown at 12, and a washer 13 is adapted to be secured over this threaded portion and held in position by means of a nut 14. A spring 15 is provided between the flange plate 11 and the washer 13 for the purpose of absorbing the tension stresses set up in the valve stem 10 and also to securely hold the valve member 4 in position upon its seat.

The valve body 1 has an inwardly projecting flange portion 16 adapted to form a seat for a poppet valve 17. The poppet valve 17 controls the passage of fuel from outlet chamber 7 to the chamber 18 formed in the valve body 1. Threaded into the end of the chamber 18 is a flanged bushing 19 having a recessed portion 20. A gasket 21 is adapted to be inserted between the bushing 19 and the valve body 1 for the purpose of providing a gas tight connection therewith. A nipple 22 projects from the bushing 19 and a nozzle tube 23, having a restricted outlet, is threaded thereon, the nozzle tube 23 being usually arranged to discharge into the feed pipe connected to the burner. A spring 24 is positioned about the raised portion 25 of the poppet valve 17 and has its other end positioned in the recessed portion 20 of the bushing 19, and against a shoulder in the bushing. This spring tends to normally close the poppet valve 17.

A cam projection 26 carried by and integral with the poppet valve 17 is adapted to project into the outlet opening 7 of the valve body 1. The cam projection 26 engages in a cutout segment 27 of the valve member 4, and is adapted to be engaged by the cam surface 30 at the end of the cut-out segment 27 when the valve stem 8 is rotated to open position.

The opening 6 in the valve member 4 comprises a circular portion which is provided at its outer extremities with a web member 28 extending across the end of the opening centrally thereof. The web member 28 is provided for the purpose of contacting with cam projection 26 when the valve is rotated in order to maintain the poppet valve in open position as the valve is rotated in full open position, that is, to position with the passage 6 aligned with the inlet opening 2 and the outlet opening 7.

The cam surface 27 has the abutting portion 29 which is adapted to act as a stop for preventing further rotation of the valve in a clockwise direction. However, this abutting portion 29 is not essential, inasmuch as the valve could be so constructed that it would operate when rotated in either direction. For the purposes of the present disclosure, however, the valve is shown as being rotatable in one direction only.

In the operation of my device, the valve when closed is in the position shown in Figure 1. When it is desired to admit gas to the burners of an ordinary gas range, the handle 9 is rotated, causing rotation of the valve member 4. The valve member 4 rotates through an angle substantially equivalent to the length of the cut-out segment 27, before any gas is admitted to the burner. As the cam surface 30 at the end of the cut-out segment 27 comes into contact with the cam projection 26 it cams the projection 27 abruptly outwardly, and moves the poppet valve 17 abruptly from its seat 16.

As shown in Figure 3, however, the valve member 4 has been rotated through an angle which permits of the passages 6 being partially aligned with the inlet opening 2 and the outlet opening 7 before the cam is engaged. This allows the gas to flow into the opening 7 before the poppet valve 17 is opened. As the poppet valve 17 abruptly opens, due to its contact with the outwardly projecting and relatively sharp cam surface 30, the spring 21 is compressed and gas flows by the valve seat 16 into the secondary outlet opening 18 of the valve body and thence through the nipple 22 to the Venturi tube 23. Further rotation of the valve member 4 operates only to permit the opening 6 to become more fully aligned with the inlet opening 2 and outlet opening 7 of the valve body 1. The cam member, after being abruptly forced outwardly by the cam end 30 of the cut-out segment 27, remains in this position during the remainder of the opening of the valve member 4 and so long as the cut-out segment is not moved back into registration with the cam projection 26. At the end of the opening 6 the cam 26 slides on the web portion 28 of the valve member 4.

In closing the valve, the opening 6 of the valve member 4 is gradually rotated out of alignment until it reaches a position shown best in Figure 3. This is the safe minimum closing position of the valve. Any further rotation in a closing direction causes the cam member 26 to slide past the abutting portion 30 of the cam surface 27 and causes the poppet valve 17 to be abruptly closed, due to the stress present in the spring 21. No more gas is allowed to enter the burner after the poppet valve has been closed. Thus it is seen that the valve can never be set too low or opened insufficiently to maintain the flame at the burner. The opening of the poppet valve is complete or not at all and the poppet valve is not opened until the plug valve is opened sufficiently to maintain the desired minimum supply through the valve.

In the same manner, when the plug valve is set down too low to maintain the desired minimum supply of gas to the burner, the poppet valve automatically closes the supply entirely.

Thus it can be seen that I have provided a simple and reliable valve, adapted to allow only a safe minimum quantity of gas to flow therethrough, any quantity of gas less than the safe minimum quantity, which in prior types of valves has been the cause of criticism, being shut off automatically and without further rotation of the valve. It is impossible to set the valve in a position permitting less gas than the safe minimum quantity to flow through the outlet opening, inasmuch as the cam member immediately slides into the grooved portion of the valve member and the poppet valve closes, immediately shutting off any gas flowing to the burner.

I do not intend to be limited to the precise details shown and described, but only insofar as defined by the spirit and scope of the appended claims.

I claim:

1. In a fuel supply valve, a valve body having an inlet and an outlet, a valve member mounted in said body and controlling communication between said inlet and said outlet, a second valve member controlling said outlet and means for operating said second valve member after a predetermined rotation of said first valve member has provided a safe minimum opening for flow of fuel between said inlet and said outlet.

2. In a valve, a valve body having inlet and outlet openings therein, rotatable valve means positioned between said openings, a cam surface carried by said valve means, a valve seat in said outlet opening, a poppet valve adapted to seat thereon and having a projecting cam member, closing of said rotatable valve causing abrupt closing of said poppet valve from full open position after a safe minimum closing position has been exceeded by said rotatable valve.

3. In a valve, a valve body having inlet and outlet openings therein, rotatable valve means positioned between said openings, a cam surface carried by said valve means, a valve seat in said outlet opening, a poppet valve adapted to seat thereon and having a projecting cam member, said poppet valve remaining in full open position until a safe minimum closing position has been exceeded by said rotatable valve, said poppet valve being entirely closed upon any further closing rotation of said rotatable valve.

4. In a valve for a fuel supply line, a valve body having inlet and outlet openings, a rotatable valve positioned between said openings for affording communication therebetween, a cam surface on said valve, a valve seat, a poppet valve seating thereon and having a projecting cam member, said first valve being rotatable to provide an opening for a safe minimum flow of fuel through said valve before said cam surface engages said cam member to open said poppet valve, and spring means tending to close said poppet valve.

5. In a valve, a valve body having inlet and outlet openings, rotatable valve means in said body between said openings, a cam surface on said valve means, a valve seat in said outlet opening, a poppet valve normally seating thereon, and a cam member carried by said poppet valve and engaged by said cam surface to provide for movement of said poppet valve only to fully open or fully closed position upon rotation of said valve means.

6. In a valve, a valve body having inlet and outlet openings, rotatable valve means disposed between said openings, a cam surface comprising a plurality of concentric surfaces having a connecting portion extending therebetween formed on said valve means, a valve seat in said outlet opening, a poppet valve normally seating thereon, and a cam member extending from said poppet valve and engaging said cam surface, said connecting portion actuating said poppet valve from closed to fully open position after a predetermined rotation of said valve means.

7. In a valve, a valve body having inlet and outlet openings, rotatable valve means disposed between said openings, a cam surface on said valve means comprising a plurality of concentric surfaces having a connecting portion extending therebetween, a valve seat in said outlet opening, a poppet valve seating thereon, spring means tending to maintain said poppet valve closed, and a cam member extending from said poppet valve and engaging said cam surface, said spring means cooperating with said concentric surfaces for preventing said poppet valve from remaining in any position intermediate its closed or fully open position.

8. In a fuel supply valve having inlet and outlet openings therein, a valve for metering the flow of fuel through said openings, a second valve adapted to close said outlet opening to flow of fuel and adapted to be opened by said metering valve only after said metering valve is in position to allow a safe minimum flow of fuel through said openings, and means for preventing said second valve from remaining in any intermediate position.

9. In a fuel supply valve having inlet and outlet openings therein, a valve for metering the flow of fuel through said openings, a second valve normally urged to closed position and maintained open by said metering valve, said second valve remaining in full open position until said metering valve is closed past a predetermined safe minimum fuel flow position, said second valve being then positively closed.

10. In a valve having inlet and outlet openings therein, a valve member for said inlet opening, a second valve member for said outlet opening, means on said first valve member operable after a predetermined movement thereof for opening said second valve member from closed position to full open position, and spring means cooperating with said last named means for preventing said second valve member from remaining in any intermediate position.

11. In combination, a fluid conduit, rotatable valve means in said conduit, normally closed secondary valve means in said conduit posterior to said rotatable valve means, and means actuatable only after a predetermined minimum opening movement of said rotatable valve means for moving said secondary valve means from closed position into full open position.

HERBERT E. TOELLE.